(12) United States Patent
Davis

(10) Patent No.: US 12,287,049 B2
(45) Date of Patent: *Apr. 29, 2025

(54) ANNULAR GROOVE ASSEMBLY FOR O-RING FACE SEAL AND RELATED METHOD OF USE

(71) Applicant: Air-Way Manufacturing Company, Olivet, MI (US)

(72) Inventor: Kevin Davis, Bellevue, MI (US)

(73) Assignee: Air-Way Manufacturing, Olivet, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,362

(22) Filed: Feb. 9, 2024

(65) Prior Publication Data

US 2024/0175524 A1 May 30, 2024

Related U.S. Application Data

(63) Continuation of application No. 17/384,414, filed on Jul. 23, 2021, now Pat. No. 11,953,123.

(51) Int. Cl.
*F16L 19/02* (2006.01)
*F16J 15/3204* (2016.01)

(52) U.S. Cl.
CPC ....... *F16L 19/0218* (2013.01); *F16J 15/3204* (2013.01)

(58) Field of Classification Search
CPC ........ F16J 15/062; F16J 15/32; F16J 15/3204; F16L 19/0218; F16L 15/008; F16L 15/006
See application file for complete search history.

(56) References Cited

U.S. PATENT DOCUMENTS

| | | | |
|---|---|---|---|
| 392,931 | A | 11/1888 | Prindle |
| 2,867,463 | A | 1/1959 | Snider |
| 7,063,329 | B2 | 6/2006 | Anderson et al. |
| 8,623,145 | B2 | 1/2014 | Bowman et al. |
| 10,539,238 | B2 | 1/2020 | Pisasale |
| 2005/0280215 | A1 | 12/2005 | Anderson et al. |

(Continued)

FOREIGN PATENT DOCUMENTS

| | | | |
|---|---|---|---|
| DE | 3036639 A1 | * | 5/1982 |
| DE | 102007021175 B3 | | 4/2008 |
| WO | 2007026576 A1 | | 3/2007 |

OTHER PUBLICATIONS

Parker "Trap-Seal" Brochure, Aug. 2006.

*Primary Examiner* — Matthew Troutman
*Assistant Examiner* — James A Linford
(74) *Attorney, Agent, or Firm* — Warner Norcross + Judd LLP

(57) ABSTRACT

A fitting that provides a sealed connection can include a face seal surface defining an annular groove having an outer wall that extends inward from the face seal surface, a floor and an inner ramp wall that extends away from the floor toward the face seal surface. The inner ramp wall can be disposed at an acute angle relative to the floor. In some applications, this angle can be about 64° to about 68°. An O-ring can be disposed in the annular groove and under tension due to being stretched over the inner ramp wall. The O-ring can exert a force radially inward toward the longitudinal axis along the inner ramp wall to thereby improve retention of the O-ring in the annular groove.

17 Claims, 5 Drawing Sheets

(56) References Cited

U.S. PATENT DOCUMENTS

2008/0191474 A1 8/2008 Kotz
2012/0223521 A1 9/2012 Kotz
2019/0390776 A1 12/2019 Forrest

* cited by examiner

ANNULAR GROOVE ASSEMBLY FOR O-RING FACE SEAL AND RELATED METHOD OF USE

BACKGROUND OF THE INVENTION

The present invention relates to a sealed connection, and more particularly, to an annular groove assembly for an O-ring face seal in a fluid conveying system.

There are a variety of fluid conveying systems used in equipment across construction, agriculture, forestry, mining, material handling, marine, industrial equipment and other markets. These systems can be hydraulic, pneumatic or other systems that convey certain pressurized fluids there though at generally high pressures. Such systems typically include a number of fittings that mate to one another and to certain components of the equipment.

In most constructions, a seal is provided at a connection between a fitting and component, or between fittings, in the system. The seal is included to inhibit a leak in the system at the connection, which can occur due to the pressurized fluids in the system leaking out between the fitting and component. In most applications, the seal can be in the form of an O-ring, which is constructed from natural or synthetic rubber. The O-ring can be placed in an annular groove in a face of the fitting.

When the fitting is joined with another fitting or component at the connection, the O-ring is trapped in the annular groove by the adjacent face of the mating fitting or component. In some applications, the annular groove in the fitting has a rectangular cross-section. Sometimes, the O-ring can be placed in the annular groove for extended periods before the fitting and component are connected. Such a rectangular groove, however, typically cannot ensure that the O-ring is retained therein before connection of the fitting to the component. In some cases, the O-ring can pop out from or generally disengage the groove, without being detected before the fitting is positioned.

To address this O-ring retention and placement issue within such grooves, certain standards have been developed for dimensions and features of grooves. As one example, a commonly acceptable O-ring retention groove is identified in the standard commonly referred to as SAE J1453-1. In the construction identified by this standard, the retention groove includes an outer diameter at an angled lip, which is disposed at a 55° angle. The outer diameter of the O-ring is slightly larger than the outer diameter at the angled lip, so that the lip traps the O-ring within the groove, with the O-ring pushing outward on the lip.

While this standard construction better retains O-rings, they still sometimes tend to fall out of the groove, or to become misaligned with the groove, partially projecting beyond the outer diameter of the lip. Where the O-ring is lost, removed, or misaligned with the groove, fitting or other component, the O-ring cannot seal the connection properly. This deficient or non-existent sealing might not be noticed until the entire system is tested under pressure by an end manufacturer or user. By this time, the fitting and/or component may be very difficult to access, and the associated equipment or machine may need partial disassembly to correct the problem.

Some manufacturers and end users (OEM's) have recognized the noted retention issues with the above, common groove, and in response, have developed special O-rings that are not round in cross section. Instead, these O-rings are polygonal in cross section so that they can adequately engage the angled lip in the groove to provide superior retention functionality. While these seals are retained better, they tend to be more complicated to manufacture and therefore more expensive than standard O-rings.

Accordingly, there remains room for improvement in the field of O-ring face seal connections to better retain the O-ring in a groove and provide good sealing attributes.

SUMMARY OF THE INVENTION

A fitting is provided to establish a sealed connection in a fluid conveying system. The fitting can include a face seal surface defining an annular groove having an outer wall that extends inward from the face seal surface, a floor and an inner ramp wall that extends away from the floor toward the face seal surface at an acute angle relative to the floor. An O-ring can be disposed in the annular groove and under tension due to being stretched over the inner ramp wall. The O-ring can exert a force radially inward toward the longitudinal axis along the ramp wall to thereby improve retention of the O-ring in the annular groove.

In one embodiment, the inner ramp wall can be disposed at an acute angle, which can be a first angle of about 64° to about 68° relative to the floor. This angle can accommodate a variety of different sized O-rings and add consistency to the formation of the annular groove.

In another embodiment, the inner ramp wall can form a frustoconical surface. The O-ring can exert the force against the frustoconical surface such that the O-ring is urged toward the floor and away from an opening of the annular groove at the engagement surface.

In still another embodiment, the annular groove can define an annular groove volume. The O-ring can fill optionally at least 70%, at least 75%, at least 80% or at least 85% of the annular groove volume when the engagement surface is placed adjacent another fitting or component to compress the O-ring within the annular groove.

In yet another embodiment, the O-ring can have a circular cross section and an O-ring inner diameter. The O-ring can include a contact area contacting the inner ramp wall between an intersection of the floor and inner ramp wall, and an intersection of the engagement surface and the inner ramp wall. This contact area can be offset from the O-ring inner diameter. Optionally, the contact area can be disposed between the O-ring inner diameter and the intersection of the engagement surface and the inner ramp wall.

In even another embodiment, the inner ramp wall can include a first ramp wall diameter and a second ramp wall diameter. The first ramp wall diameter can be closer to the floor than the second ramp wall diameter. The O-ring inner diameter can be less than the second ramp wall diameter. The O-ring inner diameter can be greater than the first ramp wall diameter.

In a further embodiment, the fitting can include a first end defining a bore extending therethrough. The bore and fitting can have a longitudinal axis and a bore wall defining the bore. The engagement face can extend radially outward away from and circumferentiating the bore.

In still a further embodiment, the O-ring cross section includes a center which can be disposed farther from the longitudinal axis than the inner ramp wall at all points along the inner ramp wall. The center can be disposed radially farther from the longitudinal axis than the outer corner between the engagement surface and the inner ramp wall.

The current embodiments provide a fitting with a sealed connection in a fluid conveying system. The annular groove can be formed with the inner ramp wall that is constructed to stretch the O-ring and guide it into the groove toward the floor. When the O-ring is slightly elastic, the O-ring can be placed under tension over the inner ramp wall and exert a force on the inner ramp wall. The acute angle of the inner ramp wall also enables the O-ring to have surprising and unexpected grip on the inner wall, retaining the O-ring in the groove with substantial force and locking fitment. In some cases, the O-ring becomes so well retained that a special pick or pointed instrument can be used to remove the O-ring from the annular groove of the fitting. In turn, this can ensure that after installation, the O-ring is well retained in the groove, with little propensity for it to fall out or be easily dislodged. As a result, after installation of the O-ring, there can be a high degree of confidence that it will remain in the groove until it is compressed in its final sealing operation to complete a sealed connection relative to the fitting. Further, with this acute angle of the inner ramp wall, for example the angle of about 64° to about 68°, it was unexpectedly discovered that the same configuration of the annular groove scaled across a range of O-ring sizes can be used to provide good retention for a variety of different O-ring sizes. Lastly, the annular groove of the fitting allows standard O-rings to provide a good seal in relation to the fitting, without having to resort to complicated O-ring cross sections.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A current embodiment of the fitting is shown in FIGS. 1-5 and generally designated 10. The fitting 10 can be used in a hydraulic, pneumatic or other system that conveys fluids under pressure. The fluid can be air or a liquid, and can be conveyed under low pressure, for example, under about 100 PSI, medium pressure, for example, about 200 PSI to about 2000 PSI, and or high pressure, for example, about 2000 PSI to 5000 PSI. Of course, fluids and liquids can be conveyed at other pressures in the system depending on the application.

Figure 1:
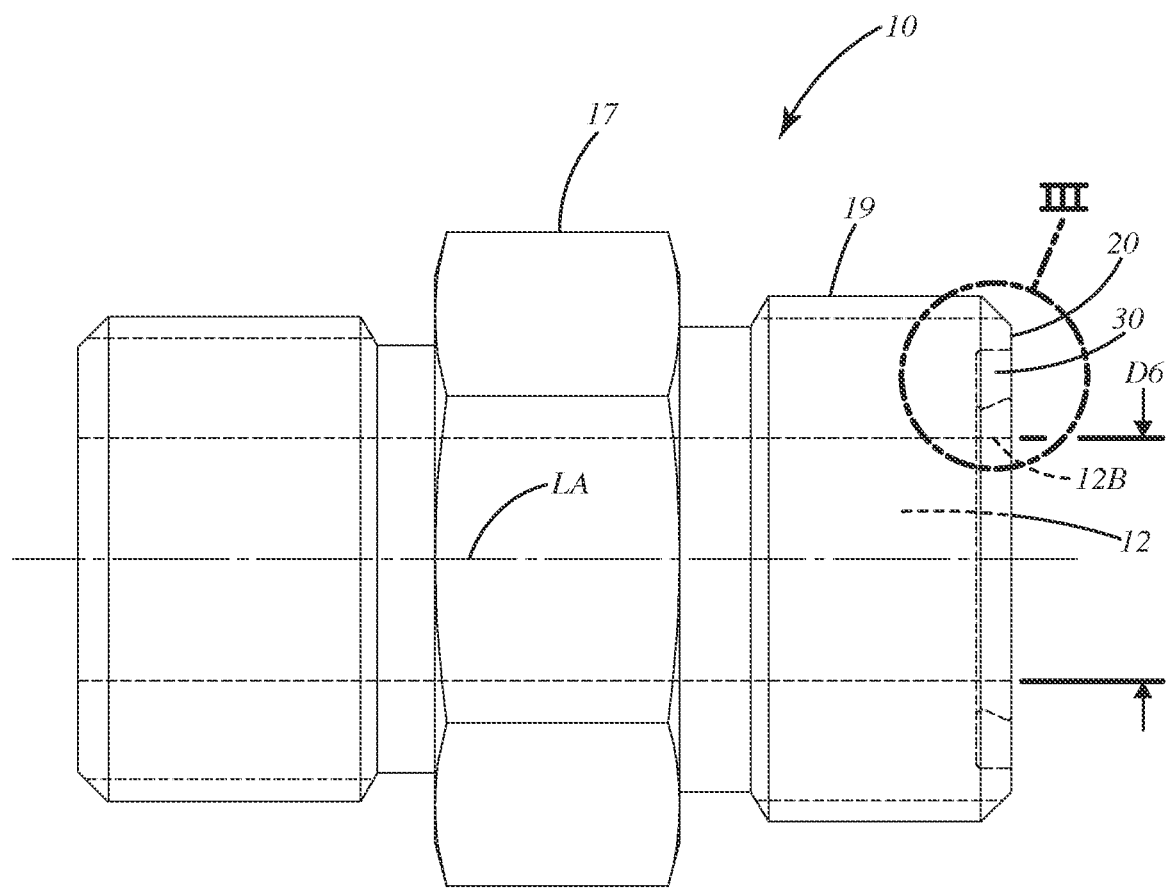
FIG. 1 is a side view of a seal assembly of a current embodiment.
Figure 2:
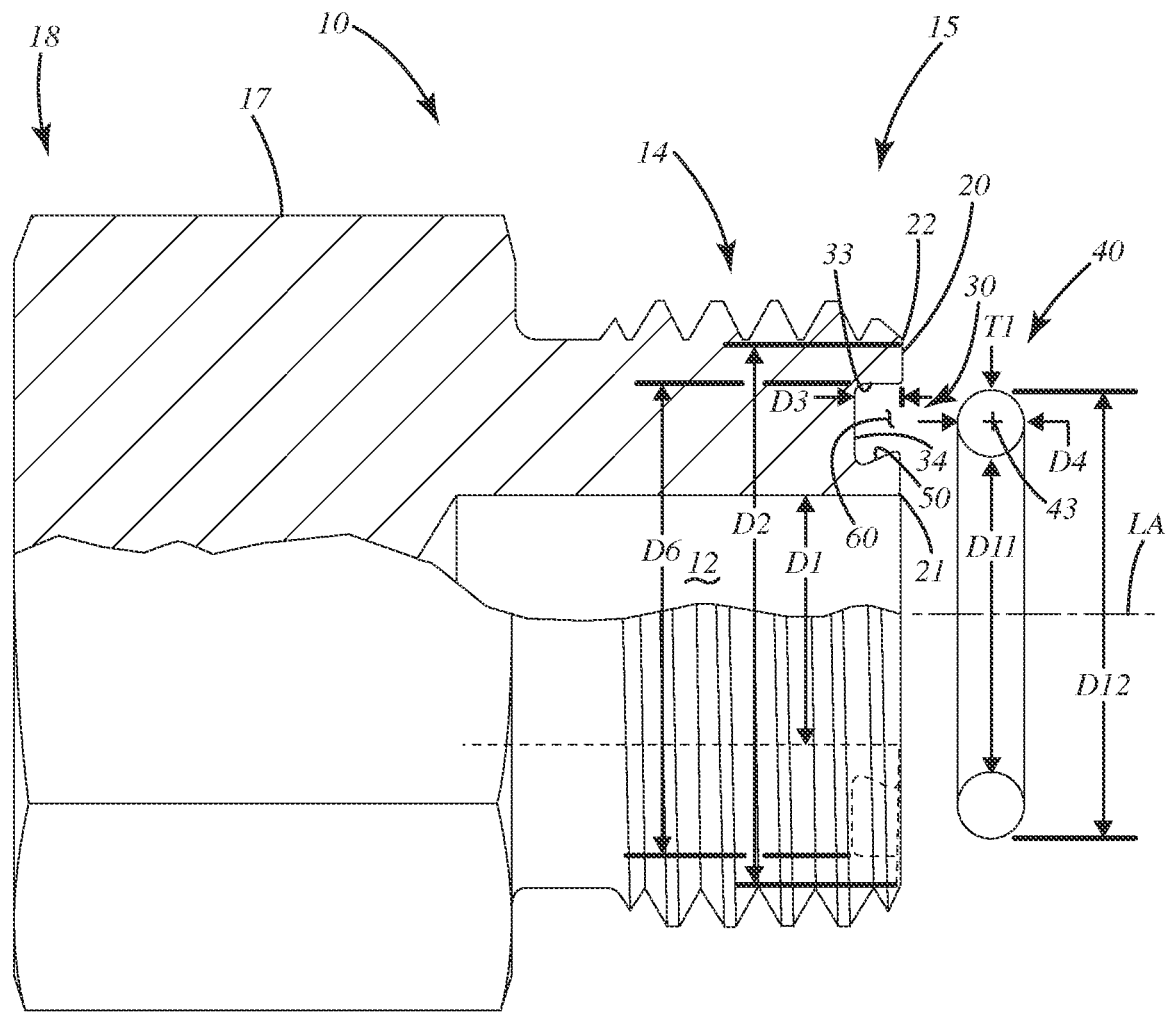
FIG. 2 is a partial section view of the assembly showing an annular groove with a O-ring before installation in the annular groove.
Figure 3:
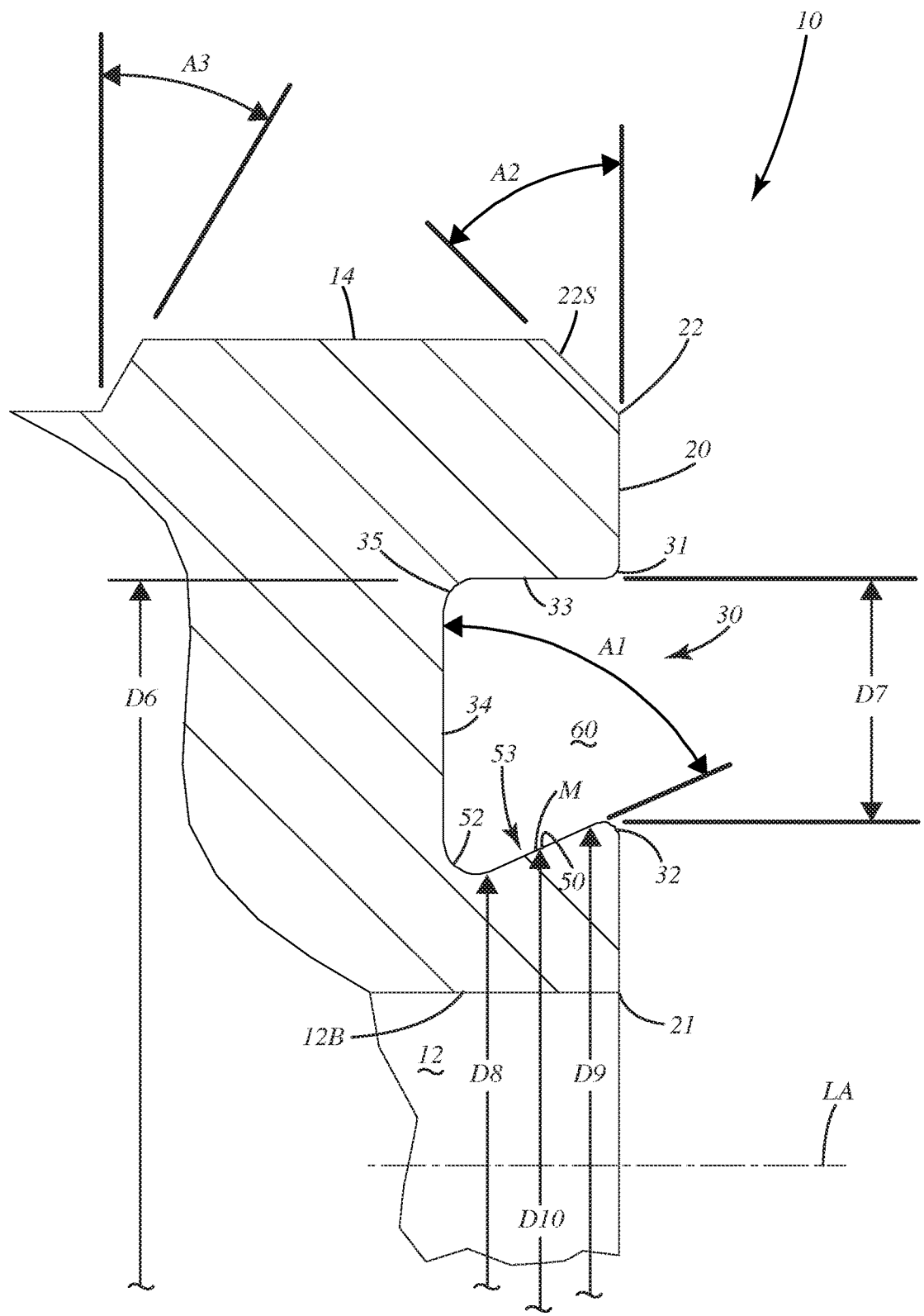
FIG. 3 is a close-up section view of the annular groove without the O-ring installed therein.

The fitting 10 can be constructed from metal, composites, polymers or other materials. The fitting 10 can include an internal bore 12 having a longitudinal axis LA that extends through the bore and the fitting. The bore 12 can be of a tubular or cylindrical shape, and can taper down from a larger diameter to a smaller diameter in the fitting. The fitting can be of a male or female configuration. As shown in FIGS. 1-3, the fitting is of a male configuration, with a threaded portion 14 extending around an outer surface of a first end 15 of the fitting. The other end 16 of the fitting can include tool lands 17, which for example can be of a hexagonal configuration. Of course, other types of tool lands or contours can be included anywhere on the outer surface, or in some applications deleted.

The first end 15 can include an engagement face 20 that is configured to be adjacent, contact and/or engage another part, component, structural element or fitting, all referred to herein as another fitting or second fitting, within a fluid conveying system. The engagement face 20 can be a planar surface of an annular or ring shape that circumferentiates the bore and/or longitudinal axis LA. The engagement face can include an inner diameter D1 and an outer diameter D2. The outer diameter can be greater than the inner diameter. The engagement face can transition to the bore 12 at a corner 21 at the inner diameter of the engagement face 20. The corner 21 can be radiused or chamfered, both referred to as radiused herein. The radius at the corner can be optionally about 0.001" to about 0.100", about 0.005" to about 0.010", or about 0.010" or about 0.005", or other dimensions depending on the application. The outer diameter D2 can transition to a corner 22, which can further transition to a shoulder 22S having an inclined angle A2, toward the threaded portion 14. This angle A2 shown in FIG. 3 can be optionally about 30° to about 80°, about 40° to about 60°, or about 45°, depending on the application.

Figure 4:
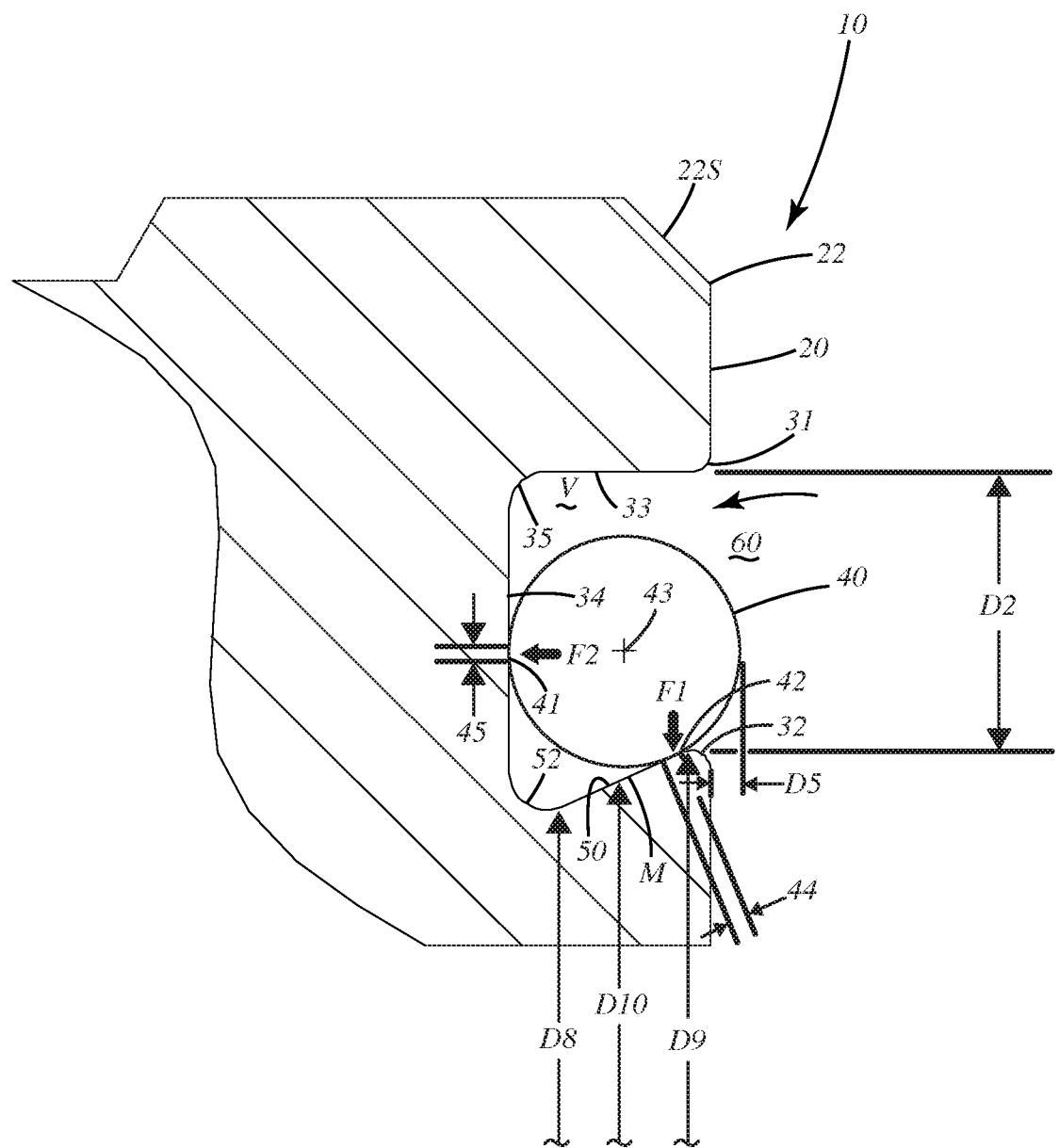
FIG. 4 is a close-up section view of the annular groove with the O-ring installed therein.

The engagement surface 20 and fitting 10 in general can define an annular groove 30, which as shown in FIG. 2 can circumferentiate the bore 12. The annular groove can retain and generally house an O-ring 40 when installed therein as described below. The annular groove can define a depth D3, which can be greater than a diameter D4 of a cross section of the O-ring, optionally by at least 1%, at least 5%, at least 10%, or at least 20% or more. Thus, when the O-ring 40 is placed in the groove 30, as shown in FIG. 4, it extends outward from the groove by a distance D5 past the engagement surface 20.

Figure 5:
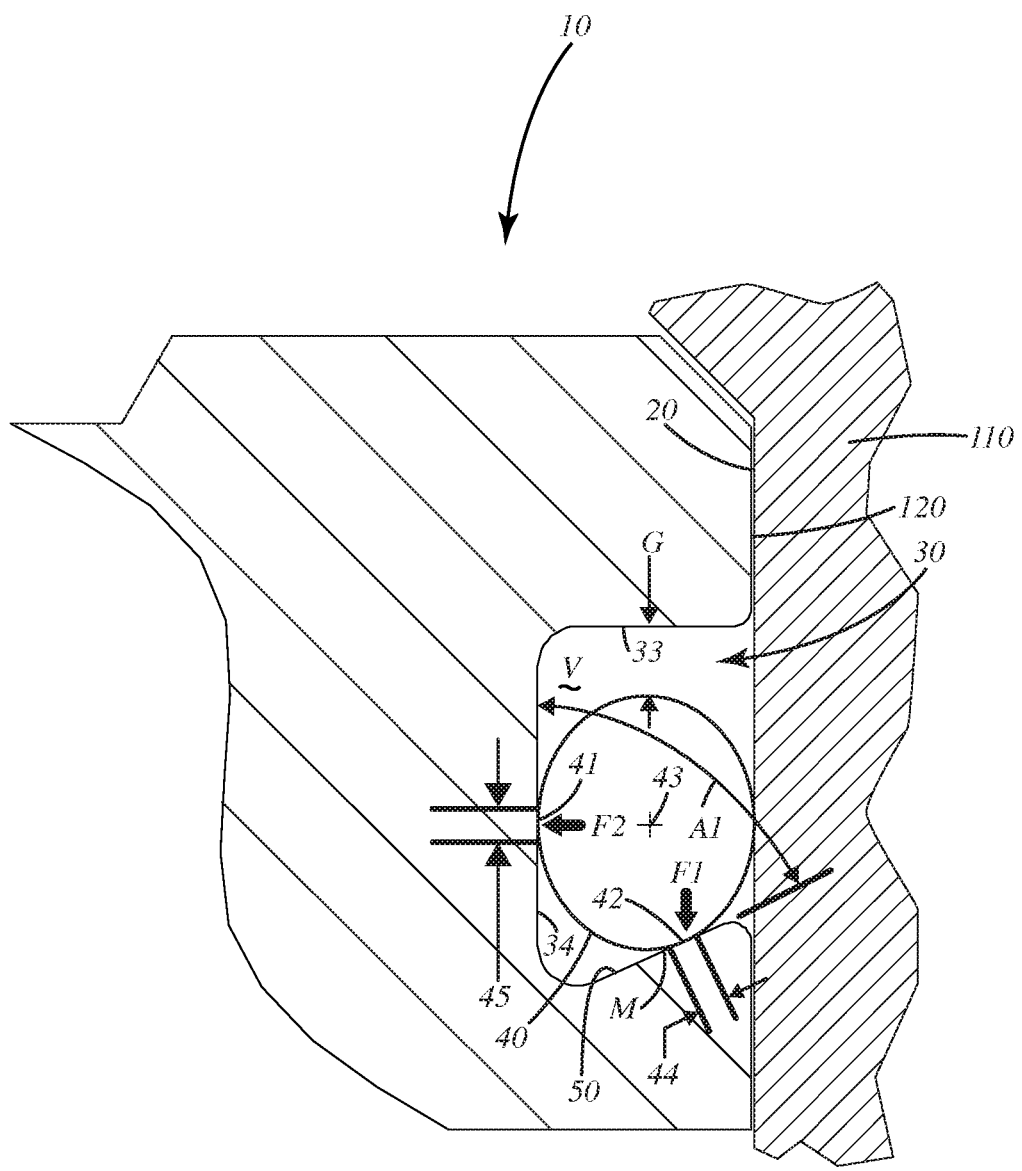
FIG. 5 is a close-up section view of the seal assembly in use forming a seal between a fitting and another component, such as another mated fitting.

When the fitting 10 is installed relative to another fitting 110, as shown in FIG. 5, the O-ring 40 is compressed into and occupies the volume V of the groove 30. That annular groove volume V extends around the longitudinal axis and can be continuous, bounded by the various walls and structures of the groove 30 as described below. When installed and in a sealing configuration as shown in FIG. 5, the O-ring can fill optionally at least 70%, at least 75%, at least 80% or at least 85% of the annular groove volume when the engagement surface is placed adjacent another fitting or component to compress the O-ring within the annular groove.

Returning to the annular groove 30 as shown in figs two and three, the various structures thereof will be described in further detail. As mentioned above, the annular groove can be defined in the engagement face 20. The annular groove can include multiple walls that connect with one another under that engagement face 20 for example, the annular groove 30 can transition to the engagement face 20 at the first outer corner 31. This first outer corner can be radiused corner, which again can be include a radius or chamfer to provide a smooth transition between the engagement face 20 and an outer wall 33. This outer wall can be transverse to the engagement face 20 and can extend inwardly into the fitting, generally away from the engagement face 20. The outer wall optionally can be substantially perpendicular to the engagement face and can circumferentiate the longitudinal axis LA of the fitting 10.

As shown in FIGS. 2 and 3, the outer wall 33 can be parallel to and concentric relative to a bore wall 12B that bounds the bore 12 about the longitudinal axis. The outer wall 33 can include an outer wall diameter D6 that can be continuous throughout the depth D3 of the annular groove 30. This outer wall diameter D6 also can be greater than the diameter D1 of the bore 12 but less than the outer diameter D2 of the engagement surface 20.

The annular groove 30 also can include a floor 34 that is disposed generally inwardly away from the engagement surface 20. The floor can transition to the outer wall 33 at the radiused first inner corner 35. This inner corner 35 can be a radiused corner having the various radii mentioned above, or alternatively can be chamfered. The floor 34 can be transverse to the longitudinal axis and/or the engagement face 20. As shown in FIG. 3, the floor optionally can be substantially perpendicular to the longitudinal axis LA. The floor optionally can be substantially parallel to the engagement face 20. The floor can be of a generally annular or disc-shaped that extends around and circumferentiates the longitudinal axis LA at the bottom of the annular groove 30. As shown, the floor also can be substantially planar and without any contours in this shape, except where it transitions to the outer wall 33 in the inner ramp wall 50.

As shown in FIGS. 2 and 3, the annular groove 30 also can be bounded by an inner ramp wall 50. It is this inner ramp wall that interacts with the O-ring 42 retain the O-ring within the annular groove 30 about the bore and generally relative to the fitting. The inner ramp wall 50 can transition to the floor 34 at a second inner corner 52. This second inner corner can be a radiused inner corner including a radius and/or a chamfer. The inner ramp wall can extend from the second inner corner to the engagement surface, where the inner ramp wall 50 transitions to the engagement surface 20 at a second outer corner 32. The second outer corner can be a radiused second outer corner. The second outer corner 32 can be closer to the longitudinal axis and a first radius outer corner 31. The groove can form an opening 60 having a dimension D7 through which the 40 can be placed. The opening 60 can be an annular opening or ring opening. This opening 60, also referred to as a groove opening can be formed between the first outer corner 31 and the second outer corner 32, with the dimension D7 between these respective corners. This dimension D7 can be optionally about 0.01" to about 0.500", about 0.010" to about 0.250", about 0.050" to about 0.100", about 0.070" to about 0.80", or about 0.75", depending on the application. This dimension D7 can accommodate a wide variety of sizes of O-rings, allowing those O-rings to easily be installed in the annular groove.

With reference to FIG. 3, the inner ramp wall 50 can be disposed at an angle A1 relative to the floor 34. This angle can be an acute angle. As shown, the angle can be about 64° to about 68°, or about 65° to about 67°, or about 66°. It is has been discovered that the acute angle provides surprising and unexpected results in that it substantially retains and secures a wide variety of O-rings having circular cross-sections within the annular groove such that notable pull out forces and/or special instruments can be used to remove the O-ring from the groove after installation.

The inner ramp wall 50 optionally can be substantially planar, without surface aberrations or contours between the second inner corner 52 and the second outer corner 32. The inner ramp wall 50 in this configuration can form a frusto-conical surface or ring 53 that circumferentiates the longitudinal axis LA within the annular groove 30. In this configuration, the inner ramp wall 50 can extend farther away from the longitudinal axis LA as the inner ramp wall extends away from the floor 34, generally toward the engagement surface 20. Although shown as a substantially planar surface, the inner ramp wall optionally can be slightly rounded or curved convexly or concavely relative to the longitudinal axis as it extends from the floor toward the engagement surface. The precise amount of concavity or convexity can vary depending on the application and engagement of the inner ramp wall with the O-ring 40.

Optionally, the inner ramp wall 50 can include varying diameters as the ramp wall transitions from the floor 34 toward the engagement surface 20. For example, the inner ramp wall can be structured to include a first ramp wall diameter D8 that is closer to the floor than a second ramp wall diameter D9. The second ramp wall diameter can be closer to the engagement surface than the first ramp wall diameter D8. Optionally, the first ramp wall diameter and the second ramp wall diameter can be disposed on opposite sides of a midpoint M which is midway between the inner corner 52 to the outer corner 32 along the surface of the inner ramp wall 50. At this midpoint M, the inner ramp wall 50 also can include a third ramp wall diameter D10, which can be less than the diameter D9 greater than the diameter D8.

As mentioned above, with reference to FIG. 2, the O-ring used in the sealed connection produced adjacent the fitting 10 generally along the engagement surface 20 can be an elastomeric O-ring constructed from natural or synthetic rubber, or in certain applications, from silicone or other polymers. The O-ring can have a circular cross-section as shown in FIG. 2. That circular cross-section can include a center 43 that is centered within the cross-section. The O-ring 40 also can include an inner O-ring diameter D and an outer O-ring diameter D12. Between this inner O-ring diameter and outer O-ring diameter is a thickness T1 which can correspond to the diameter of the O-ring taken through the center 43 of the O-ring cross-section.

Optionally, the thickness T1 can be less than the dimension or width D7 of the groove opening 60 such that the O-ring can fit cleanly through the roof opening 60. The inner O-ring diameter D11, however, can be less than the second inner diameter D9 taken at the outermost portion of the inner ramp wall 50, closest to or at the second outer corner 32 of the annular groove 30. Due to this difference in diameters, when the O-ring is installed relative to the annular groove 30 and urged into the groove opening 60, the O-ring is put under a tension so that the inner O-ring diameter D11 increases or expands to a second greater inner O-ring diameter that is greater than diameter D11. This can occur where the O-ring is constructed from the elastomeric material. With this action, the inside diameter surfaces of the O-ring can transition over the second outer corner 32 and roll onto or otherwise moved toward or engage the inner ramp wall 50. As the O-ring moves along the inner ramp wall, it also moves toward the floor 34 of the annular groove.

When the O-ring is disposed in the annular groove 30 and engages the inner ramp wall 50, the O-ring can be under a tension and exert a force radially inward toward the longitudinal axis LA of the bore 12 and fitting 10. This force F1 can act directly on and translate directly to the inner ramp wall 50 to thereby retain the O-ring in the annular groove. It will be appreciated that this force F1 is exerted and translated radially inward toward the longitudinal axis all the way around the O-ring, due to its circular shape, optionally engaging the frustoconical shape of the inner ramp formed by the inner ramp wall.

The acute angle A1 of the inner ramp wall also urges the O-ring 40 toward the ramp wall 34 until the O-ring engages the floor 34. Upon this engagement, the O-ring 40 can exert a second force F2 against the wall. Thus, the O-ring can simultaneously exert the first force F1 against the inner ramp wall 50 disposed at the acute angle, as well as the floor 34 of the groove. The O-ring can include first and second contact areas that contact the respective floor and ramp. For example, the O-ring can include a first contact area 41 that contacts the floor 34 between the first inner corner 35 and second inner corner 52. The first contact area 41 can engage a flat planar surface of the floor 34 and exert a force F2 upon the floor 34. The second contact area 42 can engage the inner ramp wall 50, optionally along the frustoconical surface thereof. The second contact area 42 can contact the inner ramp wall 50 between the second inner corner 52 and the second outer corner 32. In some cases, the second contact area 42 can contact the inner ramp wall 50 between the midpoint M and the second outer corner 32. Optionally, when the O-ring contacts the floor 34 and the inner ramp wall 50, the O-ring is distal from and out of contact with the outer wall 33. That is to say, the O-ring, when placed in the annular groove 30 initially, before the fitting 10 is attached to another fitting, can contact the floor 34 and the inner ramp wall 50, but not the outer wall 33.

With reference to FIG. 4, the O-ring 40 can include a center 43 of the cross-section shown there. When the O-ring is installed in the groove 30, the center 43 can be disposed radially farther from the longitudinal axis LA than the second outer corner 32 as well as the second inner corner 52. The center 43 can be disposed radially farther from the longitudinal axis LA than optionally a majority of points along the inner ramp wall 50, or all points along the inner ramp wall 50. When installed, the center 43 optionally can be disposed radially closer to the longitudinal axis than the first outer corner 31 and the first inner corner 35.

As mentioned above, the O-ring can include an O-ring inner diameter D11, which can be the innermost diameter of the O-ring. The inner ramp wall 50 also can include the first ramp wall diameter D8 and second ramp wall diameter D9. The O-ring inner diameter D11 can be less than the second ramp wall diameter D9. The O-ring inner diameter D11 can be greater than the first ramp wall diameter D8. These differences and relationships between these diameters can be similar in both the initially installed condition of the O-ring shown in FIG. 4, as well as the compressed and sealed condition shown in FIG. 5. When the O-ring 40 is initially installed in the annular groove 30, the contact area 42 can be located between the O-ring inner diameter D11 and the second outer corner 32 as shown in FIG. 4. In some cases, the contact area can move toward, cross over and/or intersect the inner diameter D11, which also can engage or contact the midpoint M along the inner ramp wall 50 in some cases, or might not in other cases.

As mentioned above, when the O-ring 40 is initially installed in the groove 30, it stretches slightly over the acute angle A1. Where the O-ring is elastic, it holds itself in the groove because it exerts the above noted forces F1 and F2 on the inner ramp wall and the floor. The acute angle A1 herein also rolls or urges the O-ring toward the wall, down the ramp, such that the O-ring lodges between the floor and ramp with good force. Surprisingly, it is very difficult to remove the O-ring after installation without using a dental pick or similar instrument. Further, it was discovered unexpectedly that this annular groove angled ramp wall design is well suited for a wide variety of O-rings, regardless of thickness or inside diameter. In addition, the O-ring 40 still can fill at least the percentages of volume mentioned above.

FIG. 5 illustrates the fitting 10 when it is mated to a second fitting 110 to form or complete a sealed connection. There, the fitting 10 can be disposed so that the engagement surface 20 directly engages another engagement surface 120 of the second fitting. Optionally, the second contact area 42 of the O-ring, which initially can be a ring of contact points about the inside of the O-ring when it is initially installed, can deform to form a planar ring region 44 that is disposed at the first angle A1 relative to the floor 34 when a second fitting is installed adjacent the engagement surface to compress the O-ring 40 in the groove 30. This planar ring region 44 can be partially frustoconical as it extends around the inner ramp wall. The first contact area 41 also can be deformed to another planar region 45. This region 45 can be planar as well, and can be disposed at the acute angle A1 relative to the region 44.

In the compressed condition shown in FIG. 5, the O-ring can continue to remain in contact with the floor 34 and the inner ramp wall 50, but not the outer wall 33, with which it remains at a gap G therefrom. Optionally, in some applications, the O-ring can contact outer wall 33 in the compressed condition. The O-ring also is compressed farther into the annular groove 30 by its contact with the surface 120, against which it seals to complete a sealed connection between the first fitting 20 and the second fitting 110. The fittings can be mechanically joined with one another via mated threaded portions, and this mating of the threads can urge the surfaces together and against the O-ring to complete the sealing action of the O-ring.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A fitting that provides a sealed connection, the fitting comprising:
   a first end including an engagement surface and a bore having a longitudinal axis;
   an annular groove defined in the engagement surface, the annular groove comprising:
      an outer wall that transitions to the engagement surface at a first outer corner, the outer wall being transverse to the engagement surface;
      a floor that transitions to the outer wall at a first inner corner, the floor being transverse to the outer wall;
      an inner ramp wall that transitions to the floor at a second inner corner, the inner ramp wall being disposed at a first angle relative to the floor, the first angle being about 64° to about 68°, the inner ramp wall transitioning to the engagement surface at a second outer corner that is closer to the longitudinal axis than the first outer corner; and
   an O-ring disposed in the annular groove and under tension to exert a force radially inward toward the longitudinal axis along the inner ramp wall to thereby retain the O-ring in the annular groove,
   wherein the O-ring includes a first contact area contacting the floor between the first inner corner and the second inner corner, and a second contact area contacting the inner ramp wall between the second inner corner and the second outer corner, the O-ring being distal from and out of contact with the outer wall,
   wherein an empty void is defined between the O-ring and the outer wall with no other element disposed between the O-ring and the outer wall.

2. The fitting of claim 1,
   wherein the O-ring has a circular cross section and an O-ring inner diameter,
   wherein the O-ring includes a contact area contacting the inner ramp wall between the second inner corner and the second outer corner, and offset from the O-ring inner diameter,
   wherein the contact area is disposed between the O-ring inner diameter and the second outer corner.

3. The fitting of claim 2,
   wherein the inner ramp wall includes a first ramp wall diameter and a second ramp wall diameter,
   wherein the first ramp wall diameter is closer to the floor than the second ramp wall diameter,
   wherein the O-ring inner diameter is less than the second ramp wall diameter,
   wherein the O-ring inner diameter is greater than the first ramp wall diameter.

4. The fitting of claim 3,
   wherein the inner ramp wall is planar between the second inner corner and the second outer corner,
   wherein the inner ramp wall extends farther away from the longitudinal axis as the inner ramp wall extends away from the floor.

5. The fitting of claim 4,
   wherein the inner ramp wall forms a frustoconical surface,
   wherein the O-ring exerts the force against the frustoconical surface such that the O-ring is urged toward the floor and away from an opening of the annular groove at the engagement surface.

6. The fitting of claim 1,
   wherein the annular groove defines an annular groove volume,
   wherein the O-ring fills at least 70% of the annular groove volume when the engagement surface is placed adjacent another fitting to compress the O-ring within the annular groove, wherein a remainder of the annular groove volume is empty when the engagement surface is placed adjacent another fitting to compress the O-ring within the annular groove.

7. The fitting of claim 6,
   wherein the O-ring fills at least 85% of the annular groove volume when the engagement surface is placed adjacent another fitting to compress the O-ring within the annular groove.

8. The fitting of claim 6 comprising:
   a plurality of lands forming a hexagonal tool engagement surface; and
   a plurality of threads opposite the bore extending toward the engagement surface.

9. The fitting of claim 1,
   wherein the O-ring has a circular cross section and an O-ring inner diameter,
   wherein the O-ring deforms and extends into the empty void when the engagement surface is placed adjacent another fitting to compress the O-ring within the annular groove.

10. A fitting that provides a sealed connection, the fitting comprising:
   a first end including an engagement surface and a bore having a longitudinal axis;
   an annular groove comprising:
      an outer wall that transitions to the engagement surface, the outer wall being transverse to the engagement surface;
      a floor that transitions to the outer wall, the floor being transverse to the outer wall;

an inner ramp wall that transitions to the floor, the inner ramp wall being disposed at a first angle relative to the floor, the first angle being an acute angle, the inner ramp wall transitioning to the engagement surface; and an O-ring disposed in the annular groove and under tension to exert a force radially inward toward the longitudinal axis along the inner ramp wall to thereby retain the O-ring in the annular groove, wherein the O-ring contacts the inner ramp wall but is distal from the outer wall when the O-ring is in the annular groove and under the tension.

11. The fitting of claim 10, wherein the first angle is about 64° to about 68°, wherein the O-ring has a circular cross section and an O-ring inner diameter, wherein the O-ring includes a contact area contacting the inner ramp wall and offset from the O-ring inner diameter, wherein the inner ramp wall includes a first ramp wall diameter and a second ramp wall diameter, wherein the first ramp wall diameter is closer to the floor than the second ramp wall diameter, wherein the O-ring inner diameter is less than the second ramp wall diameter, wherein the O-ring inner diameter is greater than the first ramp wall diameter.

12. The fitting of claim 10, wherein the acute angle is 64° to 68°, wherein the acute angle promotes gripping of the inner ramp wall by the O-ring, thereby retaining the O-ring in the annular groove with a force, wherein the acute angle urges the O-ring to move along the inner ramp wall toward the floor such that the O-ring lodges between the floor and the inner ramp wall, wherein the O-ring has a circular cross section, whereby the O-ring is retained in the annular groove, with a low propensity for the O-ring to be dislodged from the annular groove, wherein the O-ring deforms and extends into an empty void when the engagement surface is placed adjacent another fitting to compress the O-ring within the annular groove.

13. The fitting of claim 10, wherein an empty void is defined between the O-ring and the outer wall with no other elements disposed between the O-ring and the outer wall.

14. A fitting that provides a sealed connection, the fitting comprising:

a first end including an engagement surface and a bore having a longitudinal axis;

an annular groove comprising:

an outer wall that transitions to the engagement surface, the outer wall being transverse to the engagement surface;

a floor that transitions to the outer wall, the floor being transverse to the outer wall;

an inner ramp wall that transitions to the floor, the inner ramp wall being disposed at a first angle relative to the floor, the first angle being an acute angle, the inner ramp wall transitioning to the engagement surface; and an O-ring disposed in the annular groove and under tension to exert a force radially inward toward the longitudinal axis along the inner ramp wall to thereby retain the O-ring in the annular groove, wherein the O-ring deforms in a deformed mode to extend into an empty void when the engagement surface is placed adjacent another fitting to compress the O-ring within the annular groove, wherein the O-ring in the deformed mode moves toward but does not contact the outer wall.

15. The fitting of claim 14, wherein the acute angle is 64° to 68°.

16. A fitting that provides a sealed connection, the fitting comprising:

a first end including an engagement surface and a bore having a longitudinal axis;

an annular groove comprising:

an outer wall that transitions to the engagement surface, the outer wall being transverse to the engagement surface;

a floor that transitions to the outer wall, the floor being transverse to the outer wall;

an inner ramp wall that transitions to the floor, the inner ramp wall being disposed at a first angle relative to the floor, the first angle being an acute angle, the inner ramp wall transitioning to the engagement surface; and an O-ring disposed in the annular groove and under tension to exert a force radially inward toward the longitudinal axis along the inner ramp wall to thereby retain the O-ring in the annular groove, wherein the O-ring is the only component disposed in the annular groove between the inner ramp wall and the outer wall, wherein the acute angle is 64° to 68°.

wherein the O-ring deforms in a deformed mode to extend into an empty void when the engagement surface is placed adjacent another fitting to compress the O-ring within the annular groove, wherein the O-ring in the deformed mode moves toward but does not contact the outer wall.

17. The fitting of claim 16, wherein the O-ring in the deformed mode occupies a portion of the empty void between the inner ramp wall and the outer wall, wherein another portion of the empty void remains between the O-ring and the outer wall, with nothing in that other portion of the empty void when the O-ring is in the deformed mode.

* * * * *